(12) United States Patent
Strengert et al.

(10) Patent No.: US 9,061,670 B2
(45) Date of Patent: Jun. 23, 2015

(54) HYDRAULIC VEHICLE BRAKE SYSTEM

(75) Inventors: Stefan Strengert, Stuttgart (DE);
Michael Kunz, Steinheim an der Murr (DE)

(73) Assignee: Robert Bosch GmbH, Stuttgart (DE)

( * ) Notice: Subject to any disclaimer, the term of this patent is extended or adjusted under 35 U.S.C. 154(b) by 80 days.

(21) Appl. No.: 13/883,045

(22) PCT Filed: Sep. 5, 2011

(86) PCT No.: PCT/EP2011/065319
§ 371 (c)(1),
(2), (4) Date: Jul. 23, 2013

(87) PCT Pub. No.: WO2012/059261
PCT Pub. Date: May 10, 2012

(65) Prior Publication Data
US 2013/0292997 A1    Nov. 7, 2013

(30) Foreign Application Priority Data

Nov. 4, 2010   (DE) .......................... 10 2010 043 403

(51) Int. Cl.
*B60T 13/00* (2006.01)
*B60T 13/16* (2006.01)
*B60T 8/26* (2006.01)
*B60T 8/48* (2006.01)

(52) U.S. Cl.
CPC .............. *B60T 13/161* (2013.01); *B60T 8/267* (2013.01); *B60T 8/4872* (2013.01)

(58) Field of Classification Search
CPC ..... B60T 13/161; B60T 8/267; B60T 8/4872; B60T 8/26
USPC ............ 303/6.01, 3, 9.62, 9.71, 9.75, 15, 16, 303/20, 22.1, 113.4; 188/106 P, 156, 181 A, 188/181 C, 182
See application file for complete search history.

(56) References Cited

U.S. PATENT DOCUMENTS 5,472,264 A * 12/1995 Klein et al. ................. 303/3
5,853,229 A * 12/1998 Willmann et al. ............. 303/3

(Continued)

FOREIGN PATENT DOCUMENTS

| DE | 196 04 134 A1 | 8/1997 |
| DE | 10 2006 046 935 A1 | 4/2008 |
| EP | 0 649 781 A1 | 4/1995 |
| EP | 1 535 813 A1 | 6/2005 |
| JP | 7-117644 A | 5/1995 |
| JP | 9-310728 A | 12/1997 |
| JP | 2000-261982 A | 9/2000 |

(Continued)

OTHER PUBLICATIONS

International Search Report corresponding to PCT Application No. PCT/EP2011/065319, mailed Nov. 14, 2011 (German and English language document) (7 pages).

*Primary Examiner* — Pamela Rodriguez
(74) *Attorney, Agent, or Firm* — Maginot, Moore & Beck LLP

(57) ABSTRACT

A hydraulic vehicle brake system, preferably a slip-controlled hydraulic vehicle brake system, includes two brake circuits to which wheel brakes of front wheels are attached. The brake system further includes an additional brake circuit, which is not attached to the main brake cylinder, but is provided with a hydraulic pump for power braking. Wheel brakes of vehicle wheels are attached to the additional brake circuit and are configured to be driven by an electric motor. The electric motor is operated as a generator during a braking operation to compensate for the braking moment generated in the additional brake circuit.

7 Claims, 1 Drawing Sheet

(56) References Cited

U.S. PATENT DOCUMENTS

| | | | |
|---|---|---|---|
| 6,991,303 B2* | 1/2006 | Woll | 303/116.2 |
| 2004/0100146 A1* | 5/2004 | Giers et al. | 303/122 |
| 2005/0125133 A1* | 6/2005 | Yamada et al. | 701/70 |
| 2011/0108375 A1* | 5/2011 | Wuerth et al. | 188/106 P |
| 2013/0207452 A1* | 8/2013 | Gilles et al. | 303/9.75 |

FOREIGN PATENT DOCUMENTS

| | | |
|---|---|---|
| JP | 2005-329740 A | 12/2005 |
| JP | 2010-132048 A | 6/2010 |
| JP | 2011-56969 A | 3/2011 |
| JP | 2011-521842 A | 7/2011 |
| WO | 2009/149977 A1 | 12/2009 |

* cited by examiner

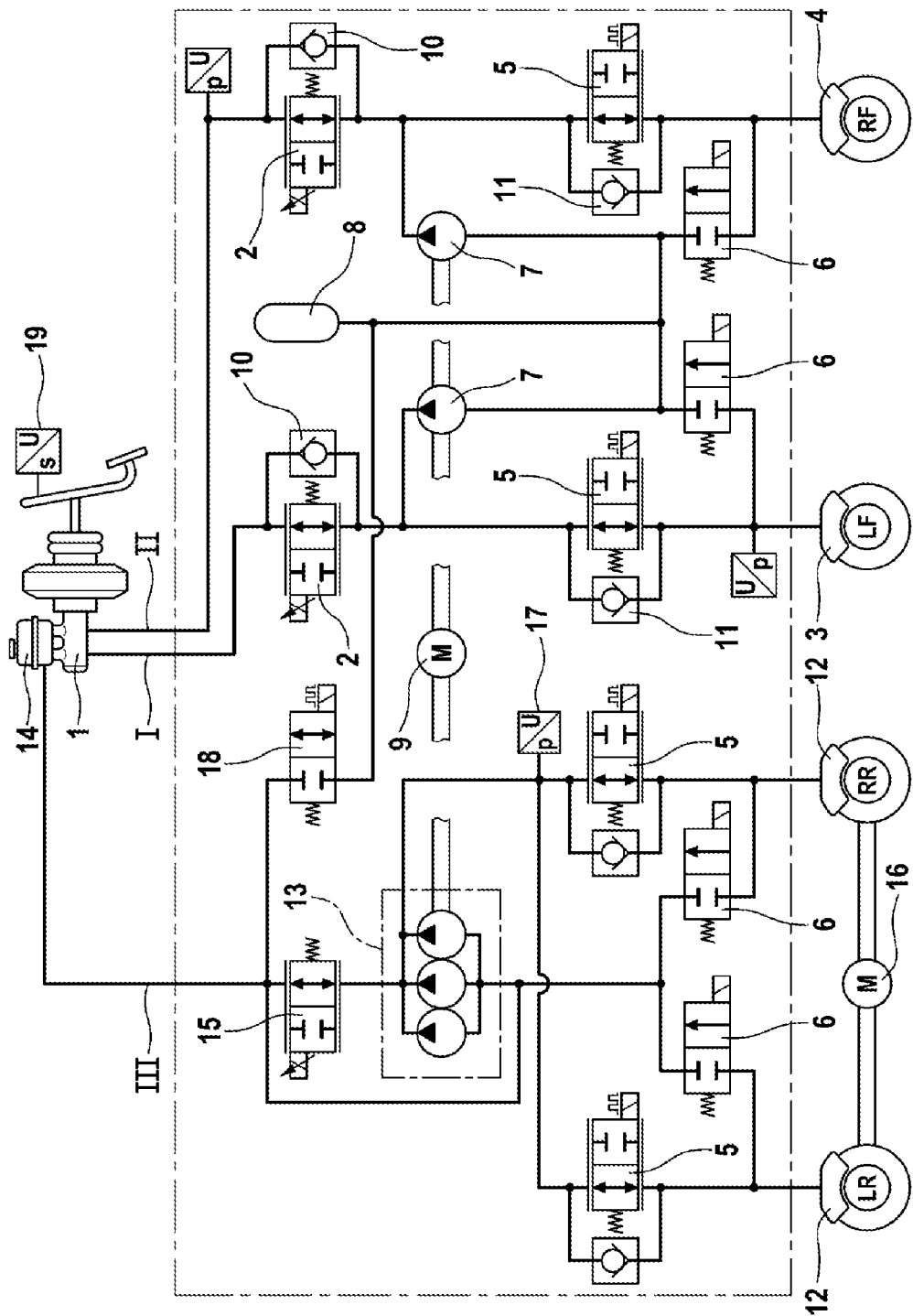

HYDRAULIC VEHICLE BRAKE SYSTEM

The invention relates to a hydraulic vehicle brake system having the features of the preamble of claim 1.

PRIOR ART

Hydraulic vehicle brake systems for motorcars generally have a dual-circuit brake master cylinder, to which hydraulic wheel brakes are connected. Various ways of splitting brake circuits are known, the term "splitting" brake circuits referring to the connection of the individual wheel brakes to the two brake circuits. Slip-controlled vehicle brake systems have brake pressure buildup and brake pressure reducing valves, by means of which wheel brake pressures in the wheel brakes can be subjected to open-loop or closed-loop control. In slip-controlled vehicle brake systems, there is furthermore a hydraulic pump in each brake circuit. Anti-lock, traction control and stability control operations, for which abbreviations such as ABS, ASR, VDC and ESP are customary, are carried out. These control operations are known to a person skilled in the art and will not be explained in detail here.

DISCLOSURE OF THE INVENTION

The hydraulic vehicle brake system according to the invention having the features of claim 1 has three brake circuits, of which two brake circuits are connected to a dual-circuit brake master cylinder and the third brake circuit has a hydraulic pump for building up brake pressure. That does not exclude the brake circuits connected to the brake master cylinder also having hydraulic pumps. The brake circuits connected to the brake master cylinder can also be understood as muscle-powered or power-assisted brake systems, while the additional brake circuit, which is not connected to the brake master cylinder, can also be understood as an independently powered brake circuit. Slip control is not essential but is preferably provided. The wheel brakes of one vehicle axle are connected to both brake circuits connected to the brake master cylinder, that is to say the wheel brake of the left hand wheel on one vehicle axle is connected to one brake circuit and the wheel brake of the right hand wheel on the same vehicle axle is connected to the other brake circuit of the brake master cylinder. At least one wheel brake of a wheel on another vehicle axle is connected to the additional brake circuit, and preferably all the wheel brakes of the other vehicle axle are connected to the additional brake circuit.

The vehicle brake system according to the invention can be implemented by relatively simple modifications to a conventional slip-controlled vehicle brake system. It is provided especially for electric or hybrid vehicles, that is to say for motor vehicles which have one (or more) electric drive motors or, more generally, one (or more) electric machines, to be precise rotary electric machines which can be operated as generators and, in the process, produce electric energy, which is stored in an accumulator and is available for driving the vehicle. Electric machines include not only electric motors but also generators. During braking, the electric machine is operated as a generator and produces a braking torque. It is possible for a vehicle driver to compensate for the braking torque of the electric machine. In more refined systems, the braking torque of the electric machine in generator mode is fully or partially compensated by a reduction in the braking force of the vehicle brake system. Compensating for the braking torque of the electric machine in generator mode by reducing the braking force of the vehicle brake system is also referred to as "blending". High-quality blending, in which a vehicle driver hardly notices the effect of the electric machine in generator mode, if at all, is complex and difficult. The invention enables high-quality blending in a relatively simple manner by open-loop or closed-loop control of the brake pressure in the additional, independently powered brake circuit, which is not connected to the brake master cylinder.

The dependent claims relate to advantageous embodiments and refinements of the invention indicated in claim 1.

BRIEF DESCRIPTION OF THE DRAWING

The invention is explained in greater detail below with reference to an illustrative embodiment shown in the drawing. The single FIGURE shows a hydraulic circuit diagram of a vehicle brake system according to the invention.

EMBODIMENT OF THE INVENTION

The hydraulic vehicle brake system according to the invention shown in the drawing has a dual-circuit brake master cylinder 1, to which two brake circuits I, II are connected via isolating valves 2. One hydraulic wheel brake 3, 4 of a vehicle axle is connected to each of the two brake circuits I, II. In the illustrative embodiment, the wheel brakes 3, 4 of a front axle are connected to the two brake circuits I and II, which are connected to the brake master cylinder 1. However, it is not essential to the invention that the wheel brakes of the front axle should be connected to the brake master cylinder 1. For each wheel brake 3, 4, brake circuits I, II have a brake pressure buildup valve 5, by means of which the wheel brake 3, 4 is connected to the isolating valve 2, and a brake pressure reducing valve 6, by means of which the wheel brake 3, 4 is connected to the intake side of a hydraulic pump 7 and to a hydraulic accumulator 8. There is a hydraulic pump 7 in each of the two brake circuits I, II connected to the brake master cylinder 1, and these hydraulic pumps can be driven by a common electric motor 9. Delivery sides of the hydraulic pumps 7 are connected between the isolating valves 2 and the brake pressure buildup valves 5.

The isolating valves 2, the brake pressure buildup valves 5 and the brake pressure reducing valves 6 are 2/2-way solenoid valves, wherein the isolating valves 2 and the brake pressure buildup valves 5 are open in the deenergized home positions thereof, and the brake pressure reducing valves 6 are closed in the deenergized home positions thereof. The isolating valves 2 and the brake pressure buildup valves 6 are proportional valves, and check valves 10, 11 are connected hydraulically in parallel therewith, with the check valves 10 of the isolating valves 2 allowing flow in the direction from the brake master cylinder 1 to the wheel brakes 3, 4, and the check valves 11 of the brake pressure buildup valves 5 allowing flow in the opposite direction from the wheel brakes 3, 4 in the direction of the brake master cylinder 1.

The brake pressure buildup valves 5 and the brake pressure reducing valves 6 form wheel brake pressure modulation valve arrangements, and by means of said arrangements and the hydraulic pumps 7 brake pressure modulation at individual wheels is possible for the purpose of slip control. Such slip control operations are known as anti-lock, traction control and/or stability control operations and will not be explained in detail here. For these slip control operations, the abbreviations ABS, ASR, VDC and ESP are customary.

Wheel brakes 12 of another vehicle axle, that is to say, in the illustrative embodiment, the rear axle, are connected to an additional brake circuit III, which is not connected to the brake master cylinder 1. The additional brake circuit III is actuated by an independent force and has a hydraulic pump 13 for building up brake pressure. The hydraulic pump 13 is driven by means of the same electric motor 9 as the hydraulic pumps 7 of brake circuits I, II. A dedicated electric motor for the hydraulic pump 13 of the additional brake circuit III (not shown) is also conceivable. As hydraulic pumps 7, 13, the illustrative embodiment of the invention which is shown has a multi-piston pump with five pump pistons, of which respective single pump pistons form the hydraulic pumps 7 of the brake circuits I, II connected to the brake master cylinder 1, and the remaining three pump pistons are connected hydraulically in parallel with one another and together form the hydraulic pump 13 of the additional brake circuit III, which is not connected to the brake master cylinder 1.

An intake side of the hydraulic pump 13 of the additional brake circuit III is connected to a (unpressurized) brake fluid reservoir 14, which can be mounted on the brake master cylinder 1, for example. The wheel brakes 12 are connected on a delivery side of the hydraulic pump 13 via brake pressure buildup valves, which are likewise indicated by reference numeral 5 here. The wheel brakes 12 are connected to the intake side of the hydraulic pump 13 via brake pressure reducing valves 6. In contrast to the situation in brake circuits I, II, there is no hydraulic accumulator provided in the additional brake circuit III on the opposite sides of the brake pressure reducing valves 6 from the wheels and on the side of the hydraulic pump 13, even though a hydraulic accumulator is not excluded by the invention. The brake pressure buildup valves 5 and the brake pressure reducing valves 6 form wheel brake pressure modulation valve arrangements, by means of which slip control can be performed in a manner known per se together with the hydraulic pump 13. The brake pressure buildup valves 5 and the brake pressure reducing valves 6 are 2/2-way solenoid valves, with the brake pressure buildup valves 5 being open in the deenergized home position thereof and the brake pressure reducing valves 6 being closed in the deenergized home position thereof, and the brake pressure buildup valves 5 being proportional valves.

The delivery side of the hydraulic pump 13 of the additional brake circuit III is connected via a brake pressure control valve 15 to the brake fluid reservoir 14. The brake pressure control valve 15 is a 2/2-way proportional solenoid valve which is open in the home position thereof. It is used to jointly control a wheel brake pressure of the wheel brakes 12 connected to the additional brake circuit III during a braking operation without slip control or even during a slip control operation.

Vehicle wheels of the wheel brakes 12 which are connected to the additional brake circuit III have an electric drive motor 16, which can generally also be understood as an electric machine. During a braking operation, the electric motor 16 is operated as a generator in order to produce power, which is stored in an accumulator and is available for driving the vehicle. The braking force of the wheel brakes 12 is reduced in accordance with a braking torque of the electric motor 16 in generator mode, i.e. the braking torque of the electric motor 16 is compensated in generator mode, with the result that a vehicle driver is hardly aware, if at all, that some of the braking effort is being produced by the electric motor 16 in generator mode and that the braking force is being correspondingly reduced in the associated additional brake circuit III. For brake pressure control, a pressure sensor 17 is connected on the delivery side of the hydraulic pump 13.

The two brake circuits I, II connected to the brake master cylinder 1 are connected to the brake fluid reservoir 14 via a connecting valve 18. The hydraulic accumulator 8, the intake sides of the hydraulic pumps 7 and the opposite sides of the brake pressure reducing valves 6 from the wheel brakes 3, 4 are connected to the connecting valve 18. The connecting valve 18 is a 2/2-way solenoid valve that is closed in the home position thereof. When it is opened, the intake sides of the hydraulic pumps 7 of the brake circuits I, II connected to the brake master cylinder 1 are connected to the brake fluid reservoir 14, and a brake pressure buildup by means of the hydraulic pumps 7 in the brake circuits I, II connected to the brake master cylinder 1 is possible even when the brake master cylinder 1 is not actuated. This is necessary, for example, for traction control and, in some cases, for stability control.

In order to avoid a situation where the wheel brakes 3, 4 of the brake circuits I, II connected to the brake master cylinder 1 are actuated in the case of a small actuating travel of the brake master cylinder 1, referred to here as pedal travel, the brake pressure reducing valves 6 of brake circuits I, II are opened at the beginning of a braking operation. The connecting valve 18 is likewise opened. The wheel brakes 3, 4 consequently remain unpressurized, and deceleration is accomplished by means of the electric motor 16 in generator mode and/or by independently powered actuation of the wheel brakes 12 connected to the additional brake circuit III, which is not connected to the brake master cylinder 1. The brake pressure buildup is accomplished by means of the hydraulic pump 13 of the additional brake circuit III. Only above a certain predetermined pedal travel are the brake pressure reducing valves 6 of the brake circuits I, II connected to the brake master cylinder 1 closed and the wheel brakes 3, 4 hydraulically actuated by means of the brake master cylinder 1. Opening the brake pressure reducing valves 6 in the brake circuits I, II connected to the brake master cylinder 1 lengthens an idle travel of the brake master cylinder 1, i.e. a pedal travel at the beginning of a braking operation, during which no pressure is built up in the brake master cylinder 1 and, as a result, the wheel brakes 3, 4 are not actuated. In the event of a fault or failure of an electronic control system, the brake pressure reducing valves 6 remain closed, ensuring that the idle travel of the brake master cylinder 1 is not lengthened. There is a pedal travel sensor 19 for open-loop or closed-loop control of the idle travel.

The invention claimed is:

1. A hydraulic vehicle brake system, comprising:
   a dual-circuit brake master cylinder having a first brake circuit and a second brake circuit;
   a wheel brake at one end of a vehicle axle connected to the first brake circuit;
   a wheel brake at another end of the same vehicle axle connected to the second brake circuit; and
   an additional brake circuit not connected to the brake master cylinder, the additional brake circuit including a hydraulic pump, to which at least one wheel brake of another vehicle axle is connected;
   wherein at least one of the wheel brakes connected to the brake master cylinder is connected via a connecting valve to the hydraulic pump of the additional brake circuit.

2. The hydraulic vehicle brake system as claimed in claim 1, wherein the wheel brakes of a front axle of a vehicle are connected to the brake master cylinder, and wherein the wheel brakes of a rear axle are connected to the hydraulic pump of the additional brake circuit.

3. The hydraulic vehicle brake system as claimed in claim 1, wherein wheels of the other vehicle axle are configured to be braked by an electric machine.

4. The hydraulic vehicle brake system as claimed in claim 1, wherein:
the hydraulic pump is a multi-piston pump,
at least two pump pistons of the hydraulic pump are assigned to the additional brake circuit, and
the at least one wheel brake of the other vehicle axle is connected to the at least two pump pistons.

5. The hydraulic vehicle brake system as claimed in claim 1, further comprising brake pressure buildup valves and brake pressure reducing valves for all the wheel brakes.

6. The hydraulic vehicle brake system as claimed in claim 5, wherein one or more of the connecting valve and the brake pressure reducing valves of the wheel brakes connected to the brake master cylinder are opened at the beginning of a brake actuation.

7. The hydraulic vehicle brake system as claimed in claim 1, wherein the additional brake circuit has a brake pressure control valve.

* * * * *